United States Patent

Hayashi et al.

Patent Number: 5,839,862
Date of Patent: Nov. 24, 1998

[54] MACHINE TOOL WITH SPINDLE HEAD PIVOTABLE ABOUT TWO AXES

[75] Inventors: Hideki Hayashi; Kazumichi Aoki; Tadashi Sano, all of Shizuoka, Japan

[73] Assignee: Toshiba Kikai Kabushiki Kaisha, Japan

[21] Appl. No.: 892,633

[22] Filed: Jul. 15, 1997

[30] Foreign Application Priority Data

Jul. 26, 1996 [JP] Japan .................................. 8-198035

[51] Int. Cl.⁶ .................................................. B23C 1/12
[52] U.S. Cl. .......................... 409/201; 408/88; 408/236; 409/199; 409/203; 409/216
[58] Field of Search ................ 408/88, 236; 409/199, 409/201, 211, 216, 235, 203

[56] References Cited

U.S. PATENT DOCUMENTS

| | | | |
|---|---|---|---|
| 97,908 | 12/1869 | Gray, Jr. .................................. | 408/236 |
| 1,748,556 | 1/1930 | McKnight ................................ | 408/88 |
| 1,991,500 | 2/1935 | Eklind ..................................... | 409/216 |
| 2,499,842 | 3/1950 | Armitage ................................ | 409/199 |
| 2,823,591 | 2/1958 | Craddock et al. ....................... | 409/201 |
| 3,088,341 | 5/1963 | Roman-Garcia ........................ | 408/88 |
| 3,806,691 | 4/1974 | Roach ..................................... | 408/236 |
| 3,923,086 | 12/1975 | Spohn, Jr. ............................... | 409/216 |
| 5,238,340 | 8/1993 | Ochiai et al. ........................... | 409/201 |
| 5,553,645 | 9/1996 | Durney ................................... | 409/199 |
| 5,765,270 | 6/1998 | Schrod et al. .......................... | 409/199 |

Primary Examiner—Andrea L. Pitts
Assistant Examiner—Christopher Kirkman
Attorney, Agent, or Firm—Jones & Askew, LLP

[57] ABSTRACT

A machine tool which has a swingable spindle head comprises a base member 1, a retaining member 5 attached swingably by a support shaft 3 to the base member 1, a spindle head 7 attached onto the retaining member 5, a lateral slider 15 being capable of linearly reciprocating in a linearly reciprocating direction along a chord of a circular arc described by an end portion of the retaining member 5, a longitudinal slider 21 provided in the lateral slider 15 reciprocating in a direction perpendicular to the chord, a connecting shaft 23 pivotally connecting the retaining member 5 to the longitudinal slider 21, and a linear drive system connecting to the lateral slider 15. When the linear drive system drives, the retaining member 5 can be swung around the support shaft 3, so that swing of the spindle head 7 can be permitted.

4 Claims, 2 Drawing Sheets

MACHINE TOOL WITH SPINDLE HEAD PIVOTABLE ABOUT TWO AXES

BACKGROUND OF THE INVENTION

1. Field of the Invention

The present invention relates to a machine tool having a swingable spindle head, and in particular, to a multiple spindle typed machining center having a swingable spindle head.

2. Description of the Related Art

A conventional machine tool having a swingable typed spindle head comprises a base member such as a spindle moving body, a ram or a saddle, and a retaining member for retaining the spindle head. The retaining member is attached onto the base member by means of a support shaft so as to swing around the support shaft. Further, the retaining member is attached with a spindle head. A swing of the retaining member is achieved by means of a gear train, such as a worm wheel attached onto the retaining member and a worm provided on the base member side, or a sector gear attached onto the retaining member and a pinion gear of double-geared type provided on the base member side.

In the aforesaid machine tool, swing of the spindle head is performed according to mesh of gears, such as the worm wheel and the worm, the sector gear and the pinion gear. For this reason, the structure of the machine tool becomes complicated. Thus, there has arisen a problem that it is difficult to make great rigidity in a drive system, taking a power transmission mechanism by gears into consideration.

Moreover, in a multiple spindle head typed machine, a gear mechanism interferes with a spindle unit as the retaining member adjacent thereto. For this reason, there is a need of considerably widely leaving an interval between retaining members arranged in the base member. Therefore, this causes a problem of making large the entirety of machine.

SUMMARY OF THE INVENTION

The present invention has been made to solve the above problems. An object of the present invention is to provide a machine tool which has a simple structure and is capable of making great rigidity in a driving system.

Another object of the present invention is to provide a machine tool which has a swingable spindle head being capable of avoiding a large size of the entirety of machine, even in a multiple spindle head typed machine.

To achieve the objects, according to a first aspect of the invention, there is provided a machine tool, comprising: a base member being movably provided on the machine tool; a retaining member being swingably attached to the base member by a support shaft, the retaining member having an end describing a circular arc when the retaining member swings; a spindle head attached onto the retaining member; a first slider movably mounted on the base member, the first slider reciprocating in a first direction parallel to a chord of the circular arc; a second slider movably mounted on the first slider, the second slider reciprocating in a second direction perpendicular to the first direction; a connecting shaft for pivotably connecting the retaining member to the second slider; and a drive system for linearly driving the first slider in the first direction.

In the construction described above, the first slider linearly reciprocates in the first direction parallel to the chord of the circular arc described by the end portion of the retaining member, the second slider linearly reciprocates in the second direction perpendicular to the first direction while being moved in the second direction together with the first slider. Therefore, the connecting shaft is moved in a manner of describing the circular arc around the support shaft, so that the retaining member can be swung around the support shaft.

Therefore, rigidity in a driving system can be enhanced with a simple structure.

According to a second aspect of the invention, as it depends from the first aspect, the drive system includes: a nut attached onto the first slider; a screw rotatably attached onto the base member being screwed with the nut; and a motor attached onto the base member driving the screw.

In the construction described above, when the screw is driven by means of the motor so as to be rotatable, the first slider linearly reciprocates in the first direction parallel to the chord together with the feed nut. Thus, the first slider can be very accurately moved in the first direction with a simple structure.

Therefore, a swingable angle of the spindle head can be secured with high precise.

According to a third aspect of the invention, as it depends from the first aspect, the base member is provided with a plurality of the retaining members, the base member is provided with a plurality of the first sliders being arranged separately from each other in the first direction parallel to the chord and being fixedly connected with each other by a connecting rod, each of the plurality of the first sliders is provided with a plurality of the second sliders, and each of the plurality of second sliders is connected with the plurality of the retaining members by a plurality of the connecting shafts.

In the construction described above, even in a multiple spindle head typed machine, when one of the first sliders linearly reciprocates in the first direction parallel to the chord, the other of the first sliders also simultaneously linearly reciprocates in the first direction, so that the retaining members simultaneously swing in the same direction.

Accordingly, there is no problem of interfering of gear mechanisms with each other, and it is possible to make narrower an interval between the retaining members arranged in the base member than the conventional interval, so that the entirety of machine size can be reduced.

According to a fourth aspect of the invention, as it depends from the third aspect, one of the plurality of the first sliders is connected to the drive system so that the other of the plurality of the first sliders reciprocates in the first direction through the connecting rod.

In the construction described above, the structure of the machine tool can be simplified. Therefore, the entirety of machine size can be further reduced even in a multiple spindle head typed machine.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 1 is a front view schematically showing a machine tool having a swingable spindle head according to one embodiment of the present invention, and shows a state that retaining members are swung with a predetermined angle from a vertical state; and FIG. 2 is a longitudinally cross sectional view of the machine tool, and shows a state the retaining members are swung back to the vertical state.

DETAILED DESCRIPTION OF THE PREFERRED EMBODIMENTS

Figure 1:
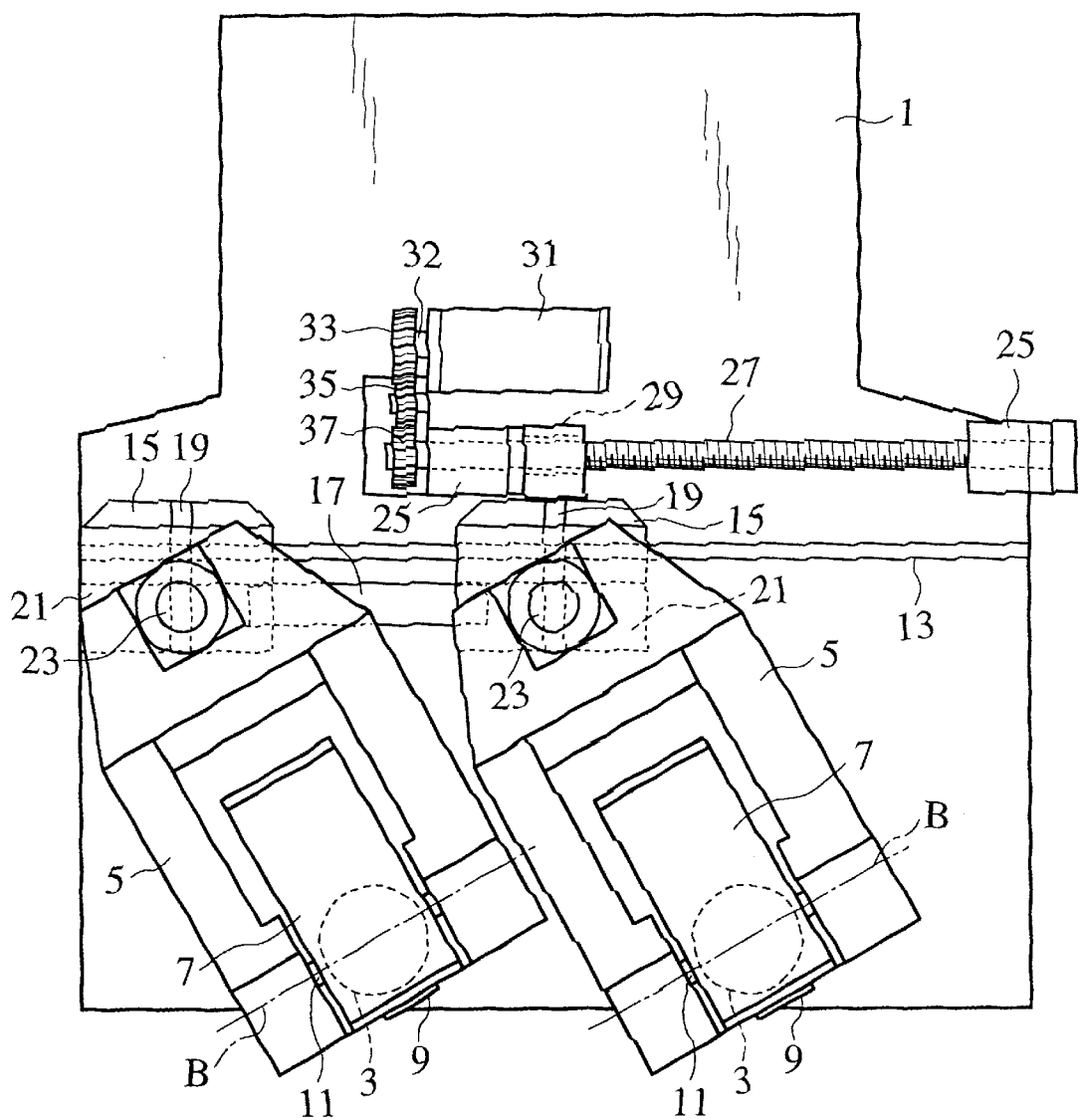

There will be detailed below the preferred embodiments of the present invention with reference to the accompanying drawings. Like members are designated by like reference characters.

Figure 2:
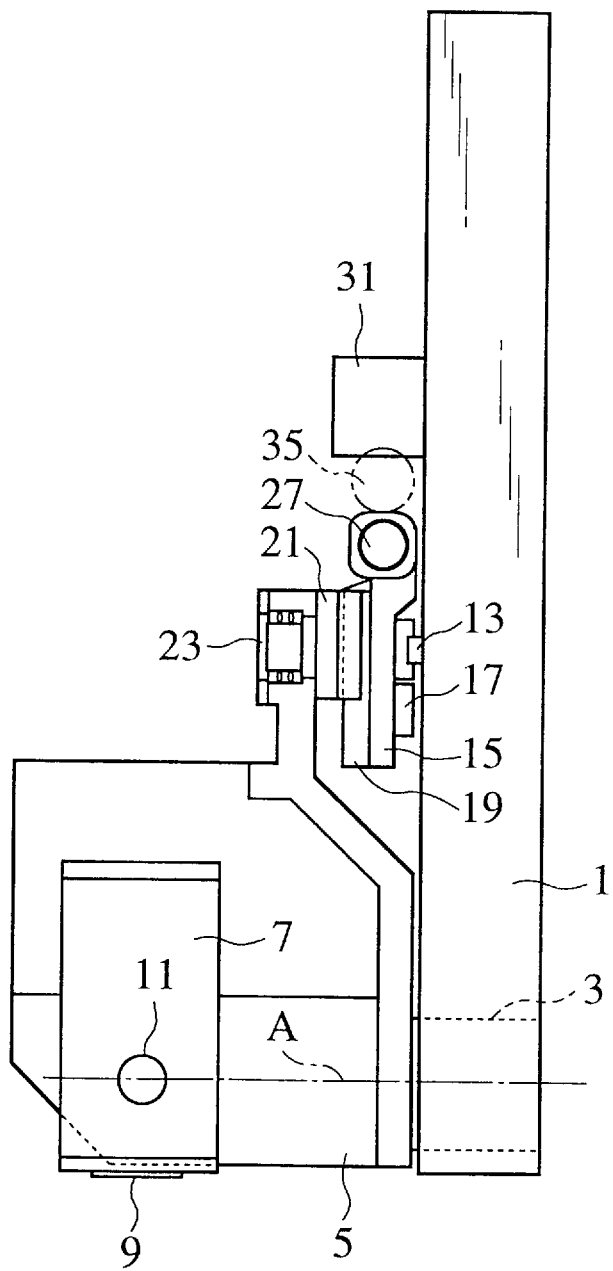

FIG. 1 and FIG. 2 show a machine tool according to one embodiment of the present invention.

In these figures, reference numeral 1 denotes a base member such as a spindle moving body, a ram, a saddle or etc. The base member is movably provided on the machine tool through a column or a frame. The base member 1 is for swingably supporting a spindle head 7 through appropriate members in a manner which will be described in detail hereinafter.

The base member 1 is attached with a retaining member 5 for retaining the spindle head 7 which is supported by means of a support shaft 3 so as to be swung around a center axial line A of the support shaft 3. According to this embodiment, as a multiple spindle head machine, two retaining members 5 are arranged on the base member 1 so that they are separated 4 from each other with a predetermined interval in right and left direction of FIG. 1.

Each of the retaining members 5 is attached with the spindle head 7. The spindle head 7 is provided with a motor therein in a manner of built-in, and also provided with a spindle 9 directed downward.

Moreover, the spindle head 7 is supported onto the retaining member 5 by means of a support shaft 11 so as to be swung around a center axial line B of the support shaft 11. Also, the spindle head 7 may be swung around the B axis by means of a general spindle swinging drive mechanism (not shown) in the B axis which is mounted on the retaining member 5. The base member 1 is provided with a linear guide portion 13 which extends in a linearly reciprocating direction as a first direction along and parallel to a chord of a circular arc described and drawn by an end portion of the retaining member 5 when the retaining member 5 swings, that is, in right and left direction of FIG. 1. The linear guide portion 13 is provided with two lateral sliders 15 as first sliders which are capable of linearly reciprocating in the linearly reciprocating direction.

The lateral sliders 15 are individually guided by the linear guide portion 13 so that they are capable of linearly reciprocating in the linearly reciprocating direction along the chord of the circular arc (i.e., right and left direction). Further, these lateral sliders 15 are fixedly connected to each other by means of a connecting rod 17 with a predetermined interval in the aforesaid linearly reciprocating direction.

Moreover, each of lateral sliders 15 is provided with a linear guide portion 19 which extends in a direction perpendicular to the chord, that is, in a vertical direction in FIG. 1 and FIG. 2. The linear guide portion 19 is fitted with a longitudinal slider 21 as a second slider which is capable of linearly reciprocating thereon in a second direction perpendicular to the linearly reciprocating direction, namely perpendicular to the first direction.

The longitudinal slider 21 provided on each lateral slider 15 is guided by means of the linear guide portion 19 so that it is capable of linearly reciprocating in the direction perpendicular to the aforesaid chord (i.e., vertical direction). Each of longitudinal sliders 21 is provided with a connecting shaft 23. An upper end portion of the retaining member 5 is pivotally connected to the longitudinal slider 21 by the connecting shaft 23.

The base member 1 is attached with a rotatable feed screw rod 27 as a screw by means of bearing portions 25. The feed screw rod 27 extends in the same direction as the extending direction of the linear guide portion 13, in other words, in the same direction as the linearly reciprocating direction of the lateral slider 15. A feed nut 29 as a nut which is attached onto the lateral slider 15 on the left-hand side in FIG. 1, is screwed into the feed screw rod 27. With the above construction, when the feed screw rod 27 is rotated, the lateral slider 15 on the right-hand side in FIG. 1 linearly reciprocates in the right and left direction by means of the feed nut 29, and also, the lateral slider 15 on the left-hand side in FIG. 1 linearly reciprocates in the right and left direction because it is fixedly connected to the right-hand side lateral slider 15 by means of the connecting rod 17.

The base member 1 is equipped with a servo motor 31 as a motor for driving the feed screw rod 27. An output shaft 32 of the servo motor 31 is attached with a driving gear 33. The driving gear 33 is meshed with a gear 37 of the feed screw rod 27 through an intermediate gear 35.

Next, the following is a description on a swingable operation of the spindle head 7. When the feed screw rod 27 is driven by means of the servo motor 31, the lateral slider 15 on the right-hand side in FIG. 1 linearly reciprocates in the right and left direction in FIG. 1, and also, the lateral slider 15 on the left-hand side in FIG. 1, which is fixedly connected with the right-hand side lateral slider 15 by means of the connecting rod 17, linearly reciprocates in the right and left direction in FIG. 1. And then, when both lateral sliders 15 are moved in the right and left direction, the longitudinal sliders 21 provided in each lateral sliders 15 linearly reciprocates in the vertical direction while being moved in the right and left direction together with the lateral sliders 15.

Thus, when the connecting shaft 23 of each lateral slider 15 is moved in a manner of describing a circular arc around each support shaft 3, namely when an end portion of the retaining member 5 is moved in a manner of describing a circular arc around each support shaft 3, each retaining member 5 is swung around the support shaft 3, thereby the spindle head 7 of each retaining member 5 is also swung around the support shaft 3.

Since a swingable drive mechanism of the spindle head 7 is constructed as described above, the swingable drive mechanism of the spindle head 7 has a simple structure. Therefore, a preload is given to components of a swingable driving system, so that rigidity of the driving system can be made increased. Moreover, even in a machine having a multiple spindle head, it is capable of avoiding a large size of the entirety of machine.

While preferred embodiments of the present invention have been described using specific terms, such description is for illustrative purposes, and it is to be understood that changes and variations may be made without departing from the spirit or scope of the following claims.

What is claimed is:

1. A machine tool, comprising:
   a base member being movably provided on the machine tool;
   a retaining member being swingably attached to the base member by a support shaft, the retaining member having an end describing a circular arc when the retaining member swings;
   a spindle head attached onto the retaining member;
   a first slider movably mounted on the base member, the first slider reciprocating in a first direction parallel to a chord of the circular arc;

a second slider movably mounted on the first slider, the second slider reciprocating in a second direction perpendicular to the first direction;

a connecting shaft for pivotably connecting the retaining member to the second slider; and a drive system for linearly driving the first slider in the first direction.

2. The machine tool according to claim 1, wherein the drive system includes:

a nut attached onto the first slider;

a screw rotatably attached onto the base member being screwed with the nut; and a motor attached onto the base member driving the screw.

3. The machine tool according to claim 1, wherein the base member is provided with a plurality of the retaining members, the base member is provided with a plurality of the first sliders being arranged separately from each other in the first direction parallel to the chord and being fixedly connected with each other by a connecting rod, each of the plurality of the first sliders is provided with a plurality of the second sliders, and each of the plurality of second sliders is connected with the plurality of the retaining members by a plurality of the connecting shafts.

4. The machine tool according claim 3, wherein one of the plurality of the first sliders is connected to the drive system so that the other of the plurality of the first sliders reciprocates in the first direction through the connecting rod.

* * * * *